United States Patent [19]

Quick

[11] Patent Number: 5,551,279
[45] Date of Patent: Sep. 3, 1996

[54] IMPACT GAUGE

[76] Inventor: Donald C. Quick, 1328 Hallam Ave., Mahtomedi, Minn. 55115

[21] Appl. No.: 540,442

[22] Filed: Oct. 6, 1995

[51] Int. Cl.$^6$ .................................................. G01M 7/00
[52] U.S. Cl. ....................................... 73/12.01; 116/203
[58] Field of Search ............................... 73/12.08, 12.09, 73/12.01; 116/203, 212

[56] References Cited

U.S. PATENT DOCUMENTS

| | | | |
|---|---|---|---|
| 2,601,440 | 6/1952 | Kerrigan | 116/114 |
| 2,843,076 | 7/1958 | Cook et al. | 116/203 |
| 3,021,813 | 2/1962 | Rips | 116/114 |
| 3,104,645 | 9/1963 | Harrison | 116/212 |
| 3,141,440 | 7/1964 | Platt | 116/114 |
| 4,060,004 | 11/1977 | Scholz et al. | 116/203 X |
| 4,125,085 | 11/1978 | Rubey | 116/203 |
| 4,239,014 | 12/1980 | Rubey | 116/203 |
| 4,361,106 | 11/1982 | Eklof | 116/203 |
| 4,424,509 | 1/1984 | Andres et al. | 116/203 X |
| 4,470,302 | 9/1984 | Carte | 116/203 X |
| 4,691,556 | 9/1987 | Mellander et al. | 73/1 B X |
| 4,763,275 | 8/1988 | Carlin | 364/508 |
| 5,269,252 | 12/1993 | Nagai | 116/203 |

*Primary Examiner*—Richard Chilcot
*Assistant Examiner*—Elizabeth L. Dougherty
*Attorney, Agent, or Firm*—Jacobson & Johnson

[57] ABSTRACT

An impact gauge for determining the cumulative impact energy along a single axis including a housing having an elongated chamber with a pair of bendable members cantilevered into the chamber, so that when an impacting member positioned in the chamber and proximate bendable member with the impact member having sufficient mass so that when the housing is subjected to an impact, the inertia of the impacting member is sufficient to permanently bend the bendable member so that one can measure the degree of bend of the bendable member which can be correlated with impacts of measured strength to enable one to determine the accumulated impact energy absorbed by the impact gauge.

16 Claims, 3 Drawing Sheets

IMPACT GAUGE

FIELD OF THE INVENTION

This invention relates generally to impact gauges and, more specifically, to inexpensive and light-weight impact gauges that can be used to determine the cumulative impact received by an object or person.

BACKGROUND OF THE INVENTION

The concept of impact-measuring devices are old in the art. In one type of impact device, measuring the diameter of an impression made in a soft liner by the impact of a hard ball thereon determines the accumulated impact. In another type of impact device, breakage of a frangible housing by the impact of a hard ball determines the threshold impact. In still other types of devices, the type of impact absorbed correlates with the length of time the impact is received. The present invention is an improved inexpensive impact device which determines the cumulative impact a person or object receives by measuring the degree of bend in a pair of bendable, non-resilient members located within the impact device.

BRIEF DESCRIPTION OF THE PRIOR ART

U.S. Pat. No. 2,601,440 shows a threshold-impact device for containers which includes a frangible material that breaks if the impact exceeds a certain level. Another embodiment holds a metal ball between two springs; if the amount of impact dislodges the ball from between springs indicates that the shock has exceeded a certain level.

U.S. Pat. No. 3,141,440 shows an impact-recording instrument that uses a set of balls placed around the periphery of a softer material such as lead or aluminum. Measuring the diameter of the depression in the softer material determines the amount of accumulated impact.

U.S. Pat. No. 3,021,813 shows a similar shock gauge with a cube-like liner extending around the exterior of a metal, wood or plastic ball, with the liner made of a softer material than the ball. Measuring the diameter of the depression in the liner determines the amount of accumulated impact of the depression in the liner.

U.S. Pat. No. 4,691,556 shows an electrical-type device to measure the amount of impact with piezo electrical films attached to the surface of the object.

U.S. Pat. No. 4,763,275 shows a force-accumulating device for sporting-protective gear, with the device including an electronic circuit to determine the force as a function of time to alert one to the fact that a person may have been subjected to too much force over too short of a period.

SUMMARY OF THE INVENTION

Briefly, the invention comprises an inexpensive impact gauge for determining the cumulative impact energy along a single axis, with the gauge including a housing having an elongated chamber for a ball to move therein. A pair of bendable members normally restrains movement of the ball along the axis of the elongated chambers. The bendable members are non-resilient so that the members bend and remain bent in proportional response to the force applied to the bendable members through the ball located between the bendable members. The mass of the ball and the impact absorbed by the impact gauge determine the forces applied to the bendable members. A calibration curve, which correlates the degree of bend with known impacts, enables determination of the amount of force on an object carried by the impact gauge by comparing the degree of bend of the bendable members after impact with the degree of bend on the calibration curve.

DESCRIPTION OF THE PREFERRED EMBODIMENT

Figure 1:
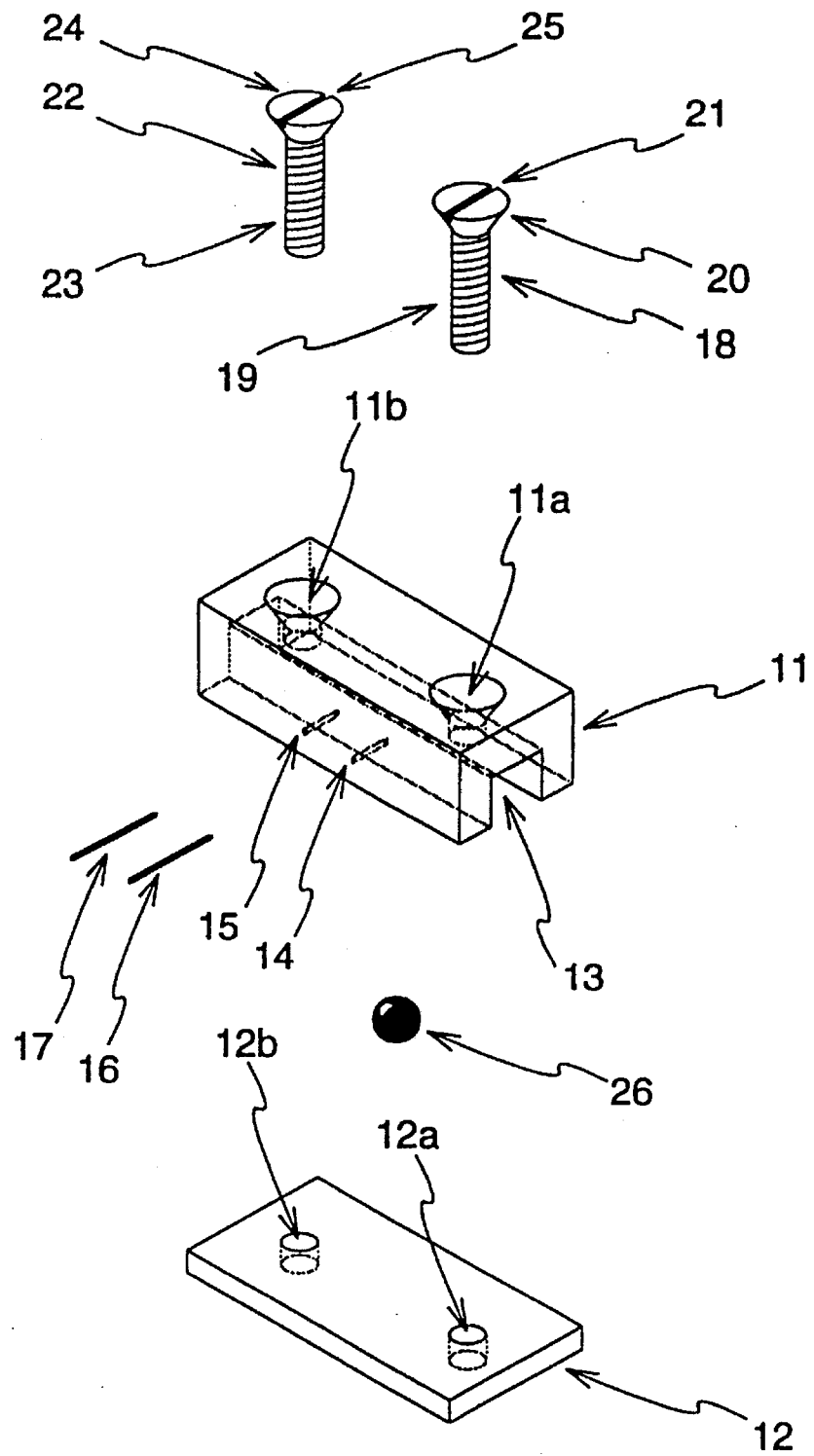
FIG. 1 shows an exploded view of my impact gauge.

FIG. 1 shows an exploded view of my impact gauge 10 comprising seven components including an elongated top member 11, an elongated bottom member 12, a pair of screws 18 and 22 for holding members 11 and 12 to one another, a pair of bendable members 16 and 17 together with a metal ball or sphere 26.

In the preferred embodiment, top member 11 is made from a see-through or transparent plastic, such as Lucite® plastic, and includes a U-shaped channel 13 extending lengthwise therethrough. The purpose of the see-through member is to allow observation of the degree of bend of bendable members 16 and 17 without having to disassemble the impact gauge. However, if desired, the top member and bottom members could be made of opaque materials. In that case, one would disassemble the gauge to measure the degree of bend.

Top member 11 includes openings 11a and 11b for extending screws 18 and 22 therethrough. Located in the side of top member 11 is a first opening 15 for insertion of first bendable member 17 therein and a second opening 14 for insertion of second bendable member 16 therein.

Located below elongated top member 11 is an elongated bottom member 12 which is preferably also made of a see-through plastic. Bottom member 12 has threaded openings 12a and 12b therein for engagement with fasteners 18 and 22 to hold top member 11 and bottom member 12 to one another as a single unit.

Located above top member 11 is a pair of identical screws 18 and 22, with screw 18 having a threaded section 19, a head 20 with a slot 21 for receiving a blade of a screwdriver. Similarly, screw 22 has a threaded section 23, and a head 24 with a slot 25 for receiving a blade of a screwdriver.

Located between top member 11 and bottom member 12 is a metal sphere or ball 26 which fits within impact gauge 10 upon assembly of the impact gauge.

Figure 2:
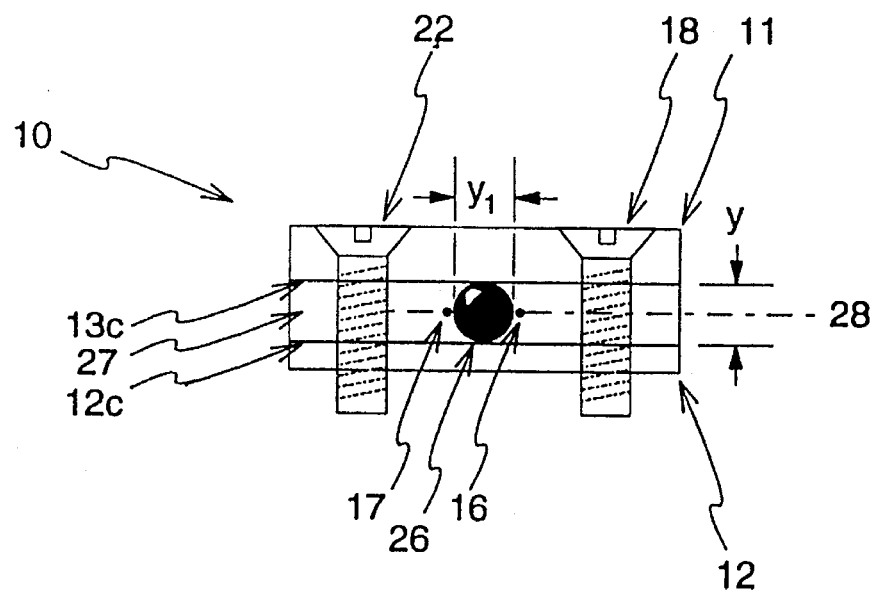
FIG. 2 shows a front view of my impact gauge in an assembled condition.

FIG. 2 shows a side view of impact gauge 10 in the assembled condition, with top member 11 secured to bottom member 12 by screws 18 and 22 to form a channel or chamber 27 therebetween. Located within chamber 27 is impact-sensitive member which comprises a spherical metal ball 26 made from steel or the like. Surface 12c of member 12 and surface 13c of member 11 restrain movement of metal ball 26 in a first axis. A pair of bendable members 16 and 17 are mounted in member 11. Members 16 and 17 normally hold ball 26 in chamber 27 but are made from material that is bendable and has minimal resiliency. One type of suitable bendable material for use as the bendable members is copper and, preferably, cylindrical annealed copper wire. The bendable material allows bending of members 16 and 17 in response to a force on ball 26.

Figure 3:
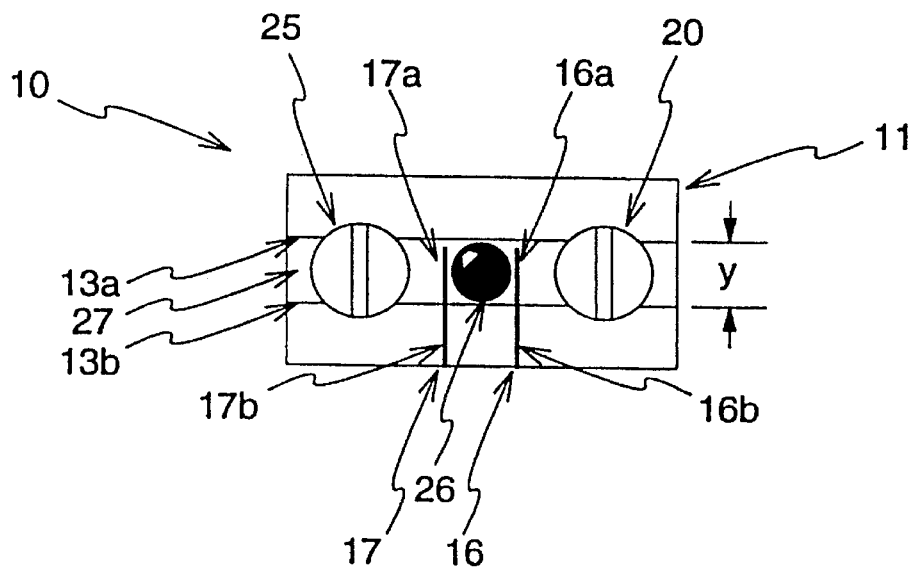
FIG. 3 shows a top view of the impact gauge of FIG. 2.

FIG. 3 shows a top view of impact gauge 10 showing ball 26 positioned within sidewall 13a and 13b of member 11 to prevent movement of ball 26 in a second axis perpendicular to surfaces 13a and 13b. While the surfaces 13a, 13b, 12c and 13c prevent movement of ball 26, the bendable members 16 and 17 only inhibit movement of ball 26 along axis 28 which is located in a direction lengthwise of members 16 and 17.

Member 16 comprises a non-resilient, non-frangible, bendable member having a first end 16b secured to first member 11 with a second end 16a projecting into chamber 27 in a cantilevered fashion. Similarly, member 17 comprises a non-resilient, non-frangible, bendable member having a first end 17b secured to first member 11 with a second end 17a projecting into chamber 27 in a cantilevered fashion. A preferred material for use in the bendable members is an annealed copper wire with the diameter of the copper wire selected in accordance with the expected impact to be measured. That is, small diameter copper wire is used if only light impacts are expected; however; larger diameter copper wire, which requires greater force to bend, is used if larger impacts are expected.

FIG. 2 shows the second end 16a of first bendable member 16 and the second end 17a of second bendable member 17 located in a Spaced and parallel position with respect to one another. In addition, bendable members 16 and 17 are located midway between surface 13c and 12c so that the major diameter of ball engages the bendable members if the impact gauge receives an impact that ensures the members will be bent in a plane extending through the two wires. A slight clearance is provided between the end of bendable members 16 and 17 and surface 13a so that the bendable members 16 and 17 are not inhibited from bending by contact with surface 13a. In addition the bendable members are cantilevered outward sufficiently far so they extend at least halfway across the chamber when the bendable members are bent. In most cases if the bendable members extend over halfway across when the bendable members are bent at least 45 degrees it is sufficient to ensure that the sides of the bendable members rather than the end of the bendable members are subject to contact with the ball.

Chamber 27 has a height designated by Y (FIG. 2) and a width designated by Y (FIG. 3). The height and width of chamber 27, which is designated by dimension Y is slightly larger than the diameter $Y_1$ of ball 26 lo allow ball 26 to move in chamber 27 without binding therein. That is, ball 26, in response to a force, is free to move along axis 28 extending through the housing formed by members 11 and 12 with the only significant resistance encountered is the resistance due to the bendable members.

In the preferred embodiment, an impact-sensitive object 26, such as a steel ball, is located in chamber 27. While steel is the preferred material, other materials that have greater or lesser density could be used as the impact-sensitive object. As stated in the preferred embodiment, members 16 and 17 are copper wire with a circular cross section. However, other types and shapes of wires could be used, for example, a wire with a square cross-section or a rectangular cross-section could be used. In each instance, one would calibrate the amount of known impact with a degree of bend in the wire. Other factors such as the materials the wire is made from as well as the degree of heat treatment of the material would affect the degree of bend for accumulated impact measurements.

Figure 4:
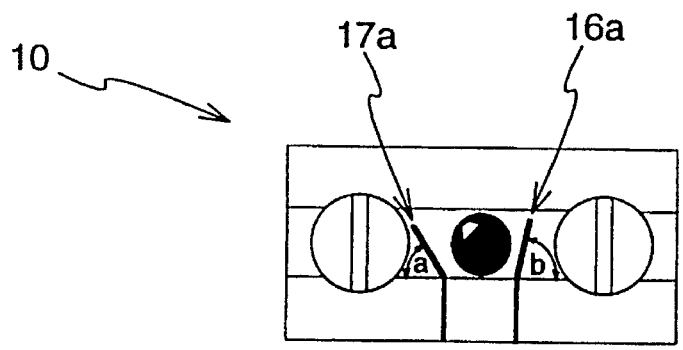
FIG. 4 shows a top view of the impact gauge after being subjected to an impact.

FIG. 4 shows impact gauge 10 after an impact or a series of impacts. Note that the wires 16a and 17a are bent. The angle made between surface 13b and 16a is denoted as angle "b", and the angle made between surface 13b and wire 17a is denoted by angle "a ." It is these two angles, "a" and "b", which can be measured and then compared with a calibration curve to determine the amount of impact absorbed by the impact gauge. It is understood that angles "a" and "b" can be unequal depending on the direction of impact along axis 28.

Figure 5:
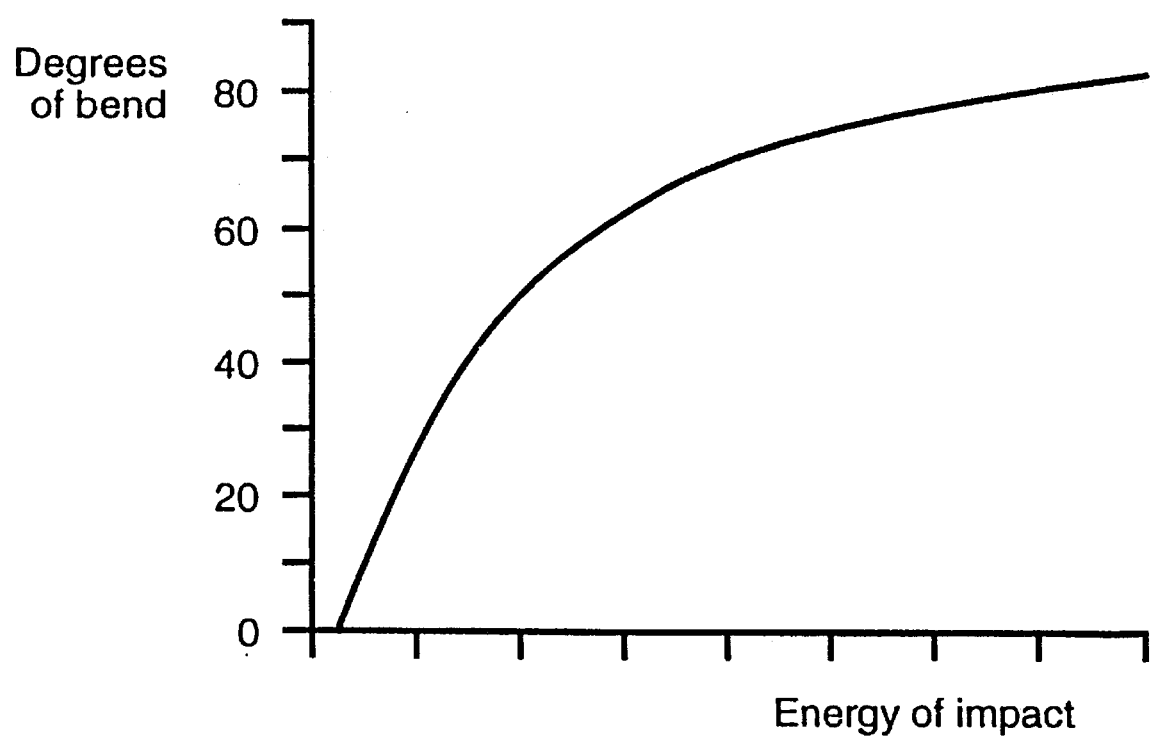
FIG. 5 shows an impact-calibration curve that facilitates determination of the amount of impact energy absorbed by an object by measuring the angle of deflection of the bendable members in the impact device.

FIG. 5 shows an Impact Gauge Calibration Curve for use in determining the amount of impact experienced by the person or object wearing the impact gauge. The degree of bend is plotted along the ordinate axis, and the cumulative impact is plotted along the abscissa. To determine the accumulated impact, one merely measures angles "a" and "b". By knowing the angles one can go to the calibration curve to determine the amount of impact absorbed by the person or object that the impact gauge is attached to. If desired, three impact gauges can be placed at mutually perpendicular angles to provide for measurements of the accumulated impact along three mutually perpendicular axes.

The impact gauge can be mounted on items such as a jogging shoe, a helmet, a package or other objects by suitable fastening means to hold the impact gauge to the object to have the impact absorbed by the impact gauge rather than the means for holding the impact gauge to the object. Suitable fastening means for fastening the impact gauge are screws, a pressure-sensitive adhesive or a tape with adhesive thereon.

While impact gauge 10 is shown with open ends, the ends could be sealed to make the impact gauge waterproof, if desired. In addition, the bendable members can be secured to the impact gauge through a friction fit or by a suitable adhesive.

I claim:

1. An impact gauge for determining the accumulated force in both directions along a single axis comprising:

a first member;

a second member, said first member and said second member securable to one another to form a housing with a chamber therein;

a first bendable member having a first end secured to said first member with a second end projecting into the chamber in a cantilevered fashion, said first bendable member comprising a cylindrical wire formed from a non-resilient but bendable material;

a second bendable member having a first end secured to said first member with a second end projecting into the chamber in a cantilevered fashion, said second bendable member comprising a cylindrical wire formed from a non-resilient but bendable material; said second end of said first bendable member and said second end of said second bendable member located in a spaced and parallel position with respect to one another;

an impact-sensitive object located in said chamber, said impact-sensitive object located between said second end of said first bendable member and said second end of said second bendable member, said impact-sensitive object having sufficient mass to bend the bendable members in proportion to an impact on the housing to thereby provide an indication of impact by an angle of bend formed by the bendable members.

2. The impact gauge of claim 1 wherein the first member is made of a see-through material so a person can quickly determine if the impact gauge has received impacts.

3. The impact gauge of claim 1 wherein the housing includes an opening extending therethrough for fastening the impact gauge to an object which is subjected to impacts.

4. The impact gauge of claim 1 wherein the bendable members are located at a distance midway of the chamber in the housing.

5. The impact gauge of claim 4 wherein the bendable, impact-sensitive object is a metal ball with the ball restrainable from movement in an axis perpendicular to a plane extending through said bendable members of said housing.

6. The impact gauge of claim 5 wherein the bendable members each have a substantially uniform cross-sectional area.

7. The impact gauge of claim 5 wherein a portion of the bendable members proximate the housing has a cross-sectional area equal to or less than a cross-sectional area of a portion of the bendable members which are normally in contact with the sphere.

8. The impact gauge of claim 7 wherein the housing is sealed to prevent moisture and dirt from entering into said chamber.

9. The impact gauge of claim 8 wherein housing has a length of less than an inch to enable unobtrusive mounting of the impact gauge on a protective piece of equipment.

10. The impact gauge of claim 9 wherein the chamber forms an elongated trough with a central axis to permit only lateral displacement of said ball along the central axis.

11. The impact gauge of claim 10 wherein the bendable members are cantilevered outward sufficiently far so they extend at least halfway across said trough when said bendable members are bent at least 45 degrees.

12. The impact gauge of claim 11 including visual markings on said housing to permit a person to determine whether the impact forces on the housing have exceeded a threshold level.

13. The impact gauge of claim 12 wherein the bendable material is copper wire.

14. The impact gauge of claim 13 wherein the metal ball has a mass less than one gram.

15. The impact gauge of claim 14 wherein the housing is made of see-through plastic.

16. The impact gauge for determining the accumulated force in both directions along a single axis comprising:

a first member;

a second member, said first member and said second member securable to one another to form a housing with a chamber therein;

a first bendable member having a first end secured to said first member with a second end projecting into the chamber in a cantilevered fashion, said first bendable member comprising a copper wire formed from a non-resilient but bendable material;

a second bendable member having a first end secured to said first member with a second end projecting into the chamber in a cantilevered fashion, said second bendable member comprising a copper wire formed from a non-resilient but bendable material; said second end of said first bendable member and said second end of said second bendable member located in a spaced and parallel position with respect to one another;

a metal ball located in said chamber, said metal ball located between said second end of said first bendable member and said second end of said second bendable member, said metal ball having sufficient mass to bend the bendable members in proportion to an impact on the housing to thereby provide an indication of impact by an angle of bend formed by the bendable members.

* * * * *